(12) United States Patent
Andersson et al.

(10) Patent No.: US 7,404,343 B2
(45) Date of Patent: Jul. 29, 2008

(54) VEHICLE STEERING WHEEL

(75) Inventors: Bjorn Andersson, Onsala (SE); Glenn Johansson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/144,518

(22) Filed: Jun. 3, 2005

(65) Prior Publication Data
US 2005/0223843 A1 Oct. 13, 2005

Related U.S. Application Data

(63) Continuation of application No. PCT/SE2003/001889, filed on Dec. 3, 2003, now abandoned.

(30) Foreign Application Priority Data
Dec. 3, 2002 (SE) .................................... 0203588

(51) Int. Cl.
*B62D 1/11* (2006.01)
(52) U.S. Cl. ........................ 74/552; 280/777
(58) Field of Classification Search .................. 74/552; 280/777
See application file for complete search history.

(56) References Cited

U.S. PATENT DOCUMENTS

| | | | | |
|---|---|---|---|---|
| 3,555,925 A | | 1/1971 | Bowser | |
| 3,556,550 A | * | 1/1971 | Enzo | 280/777 |
| 3,726,147 A | * | 4/1973 | Spietz | 74/552 |
| 4,390,193 A | * | 6/1983 | Strahan et al. | 280/777 |
| 4,633,734 A | * | 1/1987 | Yano et al. | 74/552 |
| 5,291,800 A | * | 3/1994 | Patzelt et al. | 74/552 |
| 5,476,022 A | | 12/1995 | Koyama et al. | |
| 5,490,435 A | | 2/1996 | Famili | |
| 6,073,514 A | | 6/2000 | Isomura | |
| 6,238,506 B1 | * | 5/2001 | Satoh et al. | 156/169 |
| 2001/0025546 A1 | * | 10/2001 | Sugiyama et al. | 74/552 |
| 2001/0039851 A1 | * | 11/2001 | Hosoi et al. | 74/552 |

FOREIGN PATENT DOCUMENTS

| | | | |
|---|---|---|---|
| GB | 2045184 A | | 10/1980 |
| JP | 07205819 A | * | 8/1995 |
| JP | 7323845 A | | 12/1995 |

* cited by examiner

*Primary Examiner*—Chong H Kim
(74) *Attorney, Agent, or Firm*—Novak Druce + Quigg LLP

(57) ABSTRACT

A steering wheel (1) for a vehicle such as a heavy-duty vehicle having a steering wheel spoke (5). The steering wheel spoke (5) is adapted to be deformed while absorbing energy when an external load is applied in the radial direction of the steering wheel (1) in connection with a vehicle collision while displacement of the steering wheel ring (3) and being adapted to essentially retain its shape when the deformation of the steering wheel spoke (5) takes place.

15 Claims, 5 Drawing Sheets

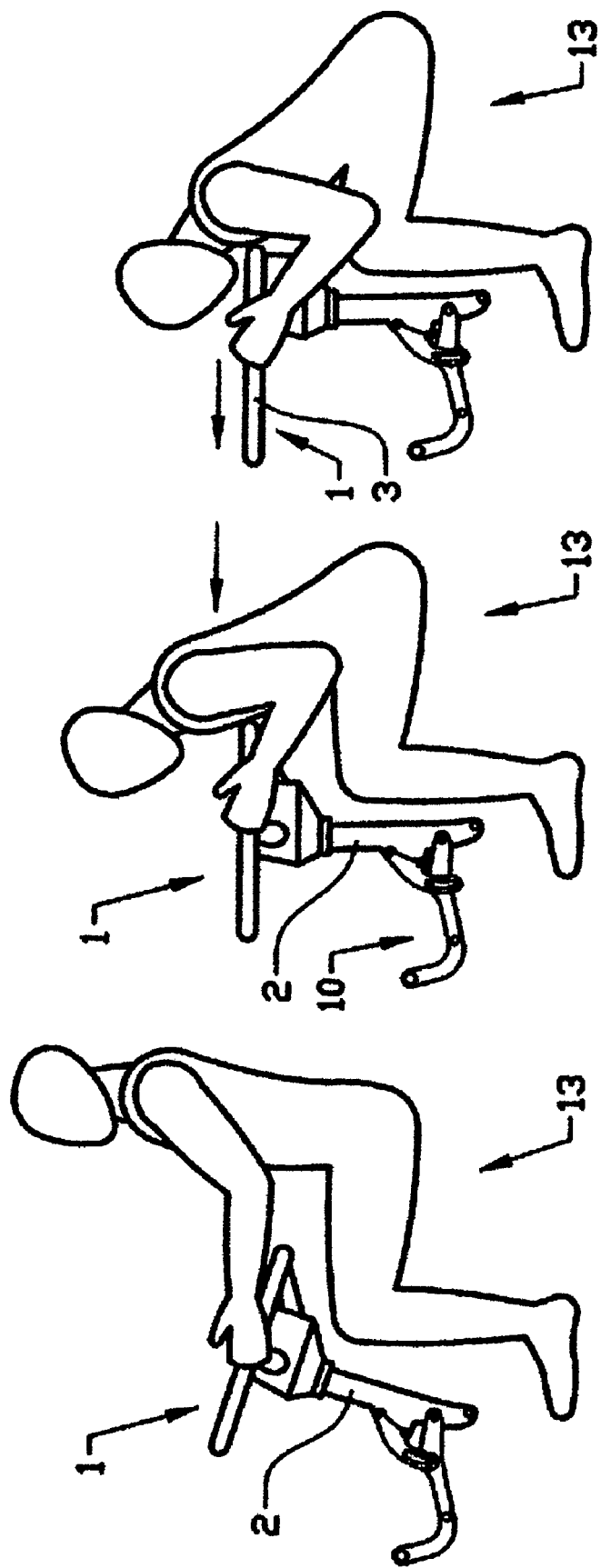

VEHICLE STEERING WHEEL

CROSS-REFERENCE TO RELATED APPLICATIONS

The present application is a continuation patent application of International Application No. PCT/SE2003/01889 filed 3 Dec. 2003 which was published in English pursuant to Article 21(2) of the Patent Cooperation Treaty, and which claims priority to Swedish Application No. 0203588-9 filed 3 Dec. 2002. Said applications are expressly incorporated herein by reference in their entireties.

TECHNICAL FIELD

The present invention relates to vehicle steering wheels.

BACKGROUND OF THE INVENTION

In connection with motor vehicles, the driver needs to be able to steer the vehicle in a simple way. To this end, motor vehicles are traditionally equipped with some type of steering arrangement, for example a vehicle steering wheel having a steering wheel ring connected to a steering wheel center via steering wheel spokes and which is arranged at right angles on a steering main shaft.

Such a steering wheel can be arranged in the vehicle in different ways. For example, the steering wheel in a vehicle of the private car type is usually arranged in front of the driver seat essentially vertically, the extension of the steering wheel ring coinciding with a plane essentially at right angles to the floor of the vehicle. In vehicles of the heavy-duty vehicle type, on the other hand, the steering wheel is usually arranged in front of the driver seat essentially horizontally, the extension of the steering wheel ring coinciding with a plane essentially parallel to the floor of the vehicle.

In the event of a collision, the driver is thrown forward in the vehicle, in the direction of the steering wheel. With a steering wheel of the heavy-duty vehicle type, the body of the driver strikes the steering wheel (the steering wheel ring, from the side in the radial direction of the steering wheel) and the steering wheel ring is deformed while absorbing energy.

One problem with an arrangement of the above type arises in vehicles of the heavy-duty vehicle type where the steering wheel usually has a great steering wheel deflection, for example 3.5 turns for full steering wheel deflection in each direction. This means that even a relatively small turning movement of the wheels, for example a deflection of the wheels in connection with a vehicle collision, results in the steering wheel starting to rotate, which can in turn lead to the protruding parts of the deformed steering wheel ring causing injury to the driver.

Even in cases when the steering wheel is equipped with an airbag, it can happen that the driver still strikes the steering wheel when a collision occurs. This can occur, for example, in the final stage of a collision sequence (which may be up to ten seconds in the case of heavy-duty vehicles) after the airbag has been emptied of the inflating gas.

Another problem in heavy-duty vehicles is that the steering wheel has to be sufficiently torsionally rigid in order to withstand the stresses which arise in the steering wheel if the steering servo should cease to function (the power steering fails) and the driver has to steer the vehicle without power assistance. The steering wheel also has to stand up to bending forces that arise on the steering wheel as a result of the driver making frequent use of it as a support when climbing into the vehicle.

BRIEF DESCRIPTION OF THE INVENTION

A main object of the present invention is to provide a vehicle steering wheel that deforms in such a way in the event of a collision that the risk of the steering wheel injuring the driver is reduced, while capabilities for energy absorption is maintained.

In at least one embodiment, the invention takes the form of a vehicle steering wheel that comprises (includes, but is not necessarily limited to) a steering wheel ring connected to a steering wheel center via at least one steering wheel spoke. The invention is characterized by the fact that the steering wheel spoke is adapted to be deformed while absorbing energy when an external load is applied in the radial direction of the steering wheel in connection with a vehicle collision, while displacement of the steering wheel ring relative to the steering wheel center is allowed. The steering wheel ring is adapted essentially to retain its shape when such deformation of the steering wheel spoke takes place.

The invention is also characterized by the fact that the vehicle steering wheel is intended to be arranged in the vehicle essentially horizontally, the extension of the steering wheel ring coinciding with a plane essentially parallel to the floor of the vehicle.

A further object of the invention is to provide a vehicle steering wheel which is adapted to withstand deformation when external loading takes place in the non-radial direction of the steering wheel.

DESCRIPTION OF FIGURES

The invention will be described in greater detail below with reference to the accompanying drawings, in which:

FIGS. 5-7 diagrammatically show a collision sequence where use has been made of a vehicle steering wheel according to the invention.

DETAILED DESCRIPTION OF THE INVENTION

Figure 1:
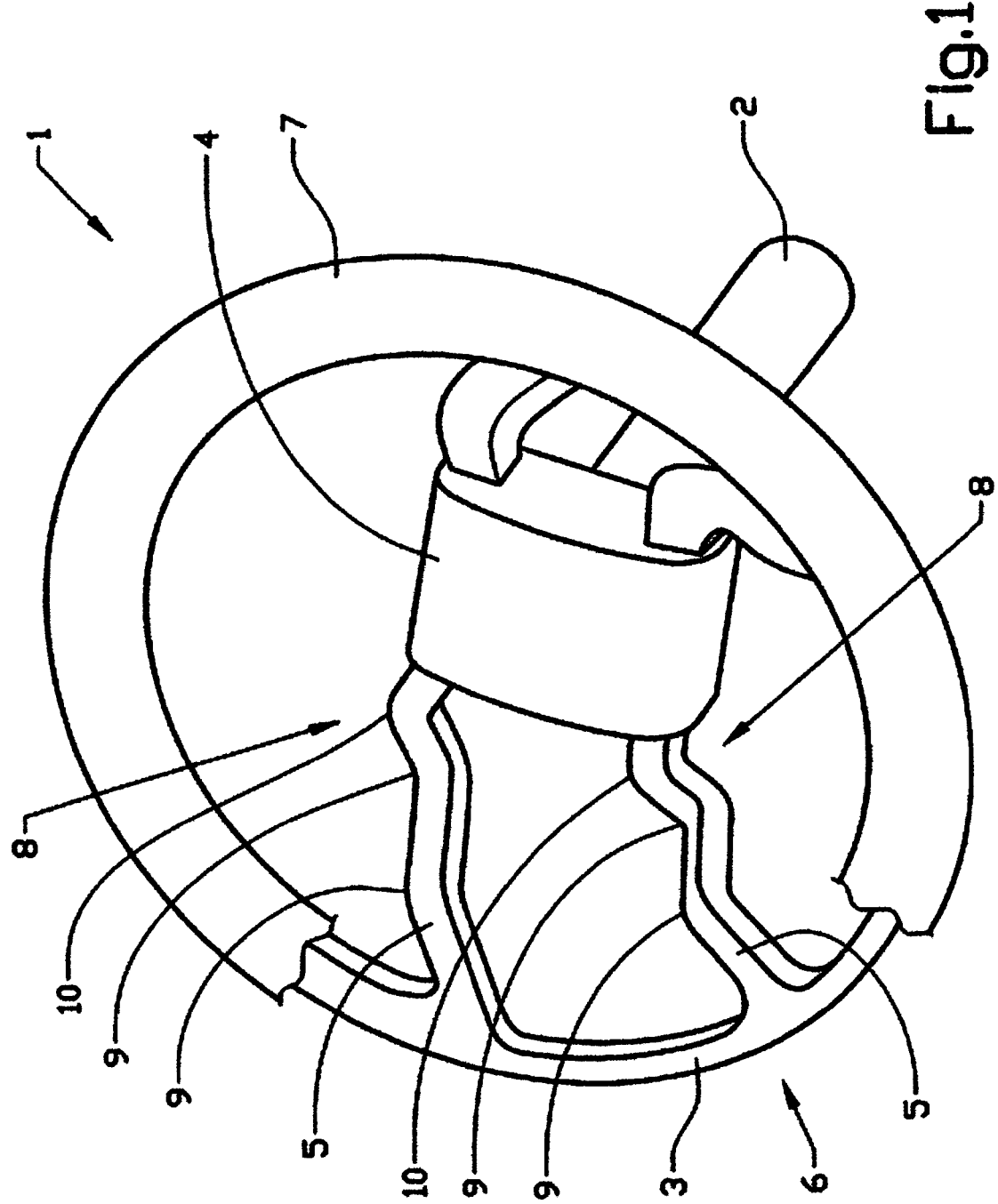
FIG. 1 is a perspective view of a vehicle steering wheel configured according to the teachings of the present invention.

FIG. 1 shows a somewhat simplified perspective view of a vehicle steering wheel 1 configured according to a preferred embodiment of the present invention and which is mounted on a steering main shaft 2. The vehicle steering wheel 1 comprises a steering wheel ring 3 connected to a steering wheel center 4 via a number of steering wheel spokes 5. Preferably, the wheel 1 is die-cast, for example in an aluminum alloy, to form a unit 6 which is surrounded by a film-coated foam plastic covering 7. The steering main shaft 2 is connected in a rotationally fixed way to the vehicle steering wheel 1 via the steering wheel center 4.

The steering wheel spokes 5 are dimensioned and shaped so as, while absorbing energy, to be deformed in a controlled way when a given predetermined load is applied in the radial direction of the steering wheel 1, but are at the same time dimensioned so as to withstand deformation when external loading takes place in the non-radial direction of the steering wheel 1. In connection with the steering wheel spokes 5 being deformed when a load is applied in the radial direction of the steering wheel 1 in the event of a vehicle collision, displacement of the steering wheel ring 3 relative to the steering wheel center 4 is allowed. To this end, the steering wheel spokes 5 are designed with a deformation portion 8. This deformation portion 8 can be designed with one or more folds 9 so as in this way to allow the spoke 5 to be folded when a given load is applied in the radial direction. The deformation portion 8 can also be designed with a relatively abrupt change in the direction of extension of the spoke 5 in the form of an angle 10 which facilitates control of the direction of the deformation.

Figure 2:
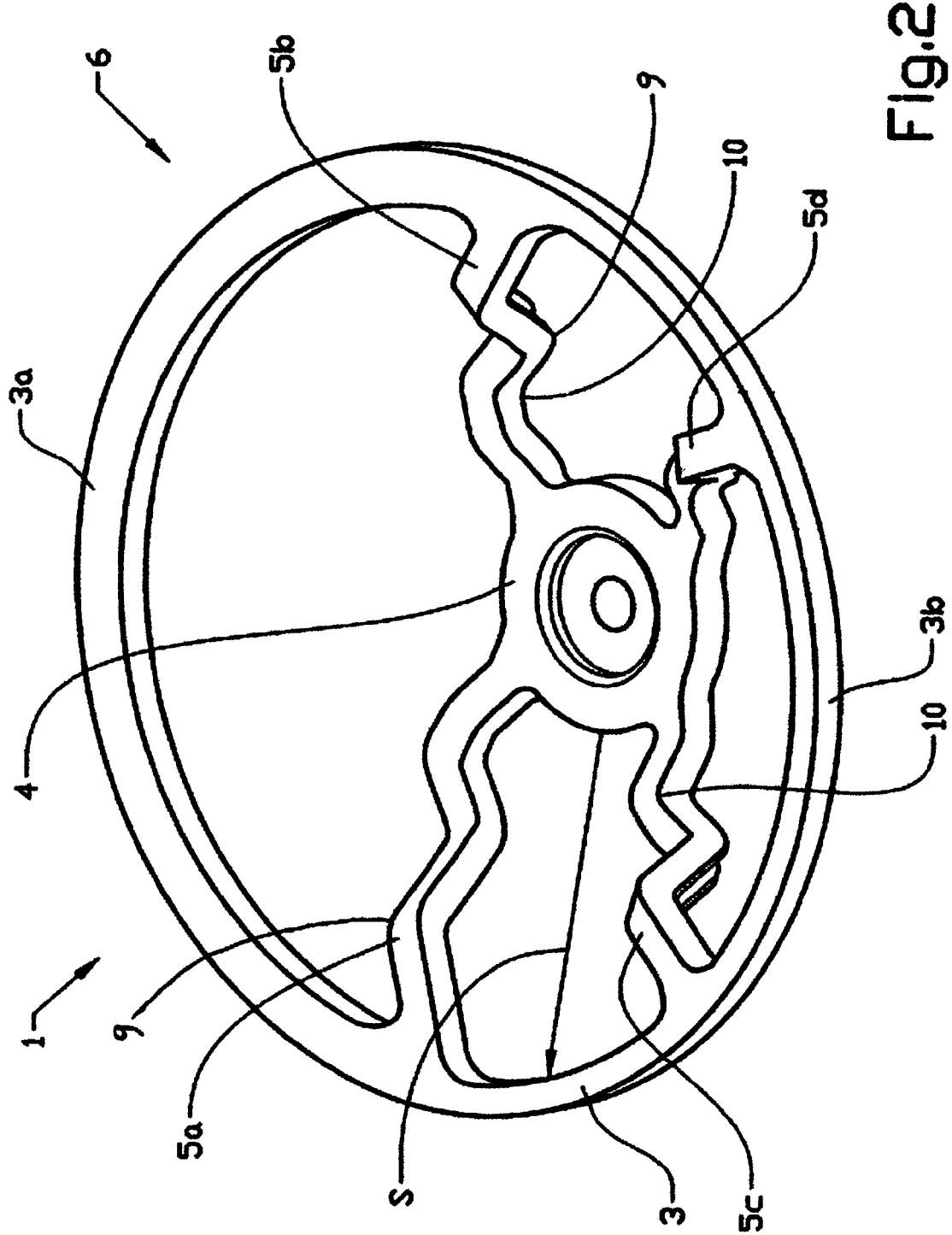
FIG. 2 is a perspective view taken at an angle from above of a vehicle steering wheel die-cast as a unit and having a steering wheel ring connected to a steering wheel center via steering wheel spokes according to the invention.

FIG. 2 shows a view at an angle from above of a die-cast steering wheel 1 in the form of a unit 6 configured according to a preferred form of the invention. The steering wheel 1 has four steering wheel spokes 5*a*, 5*b*, 5*c*, 5*d* which connect the steering wheel ring 3 to the steering wheel center 4. As can be seen in FIG. 2, the steering wheel spokes 5*a*, 5*b*, 5*c*, 5*d* are not positioned symmetrically in relation to one another. This leads to the steering wheel ring 3—in a portion 3*a* which extends between the two spokes 5*a* and 5*b*; that is to say, the stretch between the spokes around the steering wheel ring furthest from the driver with the steering wheel in a normal position—having a wider cross section than the corresponding portion 3*b* which extends between the spokes 5*c* and 5*d* which is the stretch between the spokes around the steering wheel ring closest to the driver (with the steering wheel in a normal position) in order to have corresponding rigidity. The normal position of the steering wheel means the essentially horizontal positioning of the steering wheel with the steering wheel in an unrotated position, which means that the wheels are also not turned. As can be seen in FIG. 2, the steering wheel ring is therefore suitably designed so that a cross-sectionally wider first portion 3*a* essentially extends over a longer distance around the steering wheel ring between two spokes than a narrower second portion 3*b* extends between two spokes.

The cross section of the steering wheel ring and of the spokes can have the shape of, for example, a U-section (see FIG. 2). This will be described in greater detail in the following example. The shape of a U-section is known per se, but is defined in this example by a first component part the base, the bottom of the U, which interconnects two further parts which are not themselves joined together. These two parts which are not themselves joined together are defined here as what are known as flanges.

It can be advantageous, as can be seen in FIG. 2, for the same quantity of material to be used in each cross section of the U-section. Therefore, in the first portion 3*a*, the base in the U-section is longer, while the flanges in the U-section are shorter, both in relation to the second portion 3*b*. In the second portion 3*b* on the steering wheel ring, therefore, one flange or both flanges is or are longer than the flange in the first portion 3*a*, while the base in the second portion 3*b* is shorter than the corresponding base in the first portion 3*a*. Another reason for making the flanges in the first portion 3*a* relatively short is that the coated foam plastic covering is to cover the steering wheel ring at the same time as the steering wheel is made to achieve desired ergonomic aims with regard to the thickness of the cross section. This therefore has a limiting effect on the cross section of the U-section. The width of the base, that is to say the interconnecting part in the U-shape, is of the order of, for example, 20 mm in the first portion 3*a*, while the width of the base in the second portion 3*b* is of the order of 13 mm. In normal driving position, the steering wheel ring is suitably designed in such a way that the U-section in cross section forms an inverted U; that is to say, the base part lies in the upper part of the steering wheel ring while the flanges which extend from the base preferably run essentially vertically downward.

One object of the present invention is that the steering wheel ring remains essentially intact under compressive load in the event of a collision. By virtue of the fact that the steering wheel ring is therefore designed with a first portion 3*a* which has a wider cross section than a second portion 3*b*, a steering wheel ring is obtained which is adapted essentially to retain its shape when the steering wheel spokes are deformed.

The figure also shows how the steering wheel spokes 5*a*, 5*b*, 5*c*, 5*d* are each designed with an angle 10 in order to facilitate control of the direction of the deformation. These angles 10, together with the folds 9, lead to the steering wheel being deformed in a controlled way when a given predetermined load, preferably 4 to 10 kN, is applied in the radial direction of the steering wheel 1. The magnitude of the load at which deformation of the steering wheel 1 begins can be controlled by varying the deformation distance "S" of the steering wheel; that is to say, the distance from the steering wheel ring 3 to the steering wheel center 4. At increased length of the distance "S", the magnitude of the load can be reduced.

Figure 3:
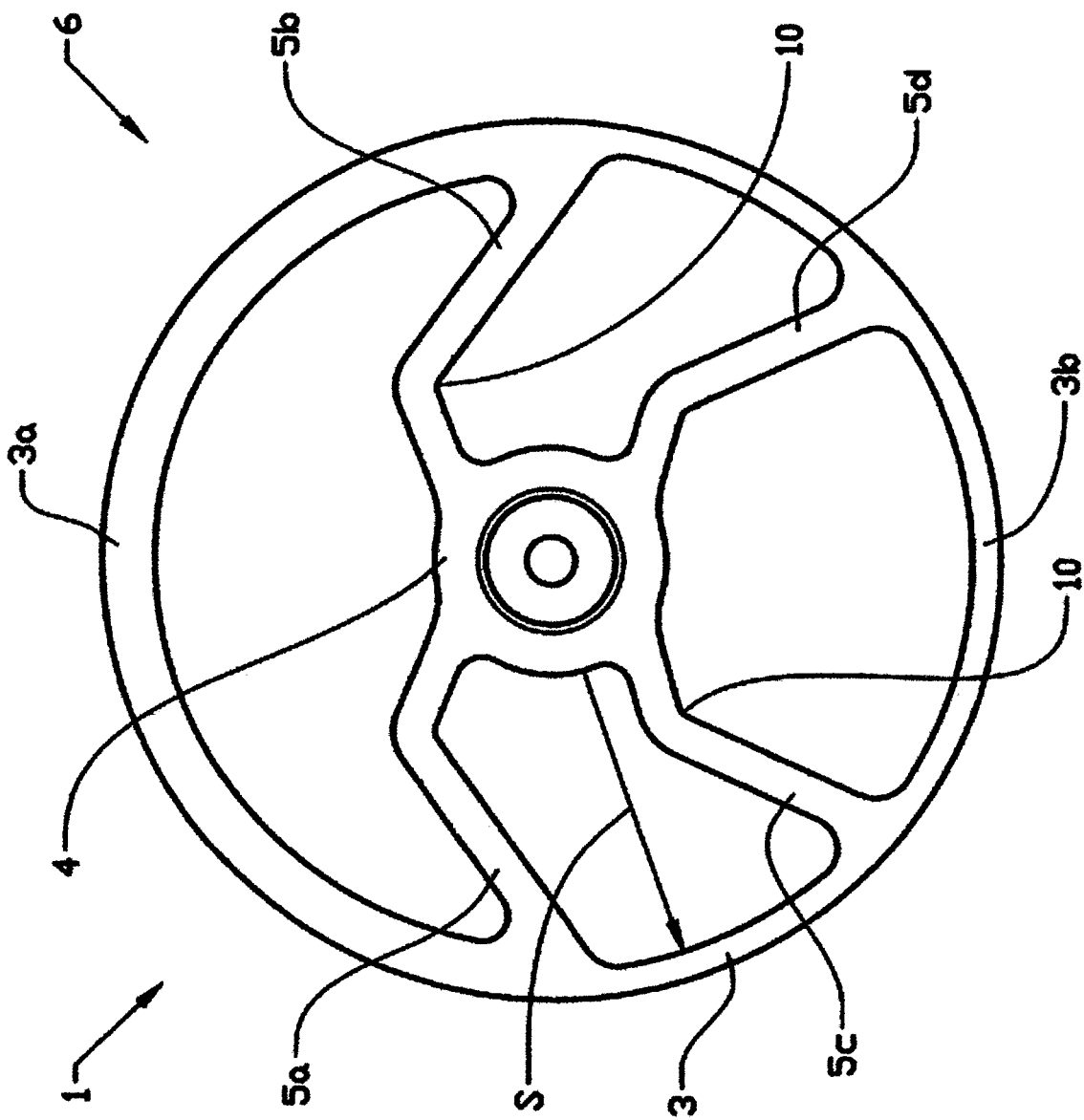
FIG. 3 is a plan view taken from directly above the steering wheel of FIG. 2.

With reference to FIG. 3, which is a view from directly above of the die-cast vehicle steering wheel 1 in the form of a unit 6 shown in FIG. 2, it can be seen clearly that the angle 10 has an extension which lies in a plane essentially parallel to the plane of extension of the steering wheel ring 3.

Figure 4:
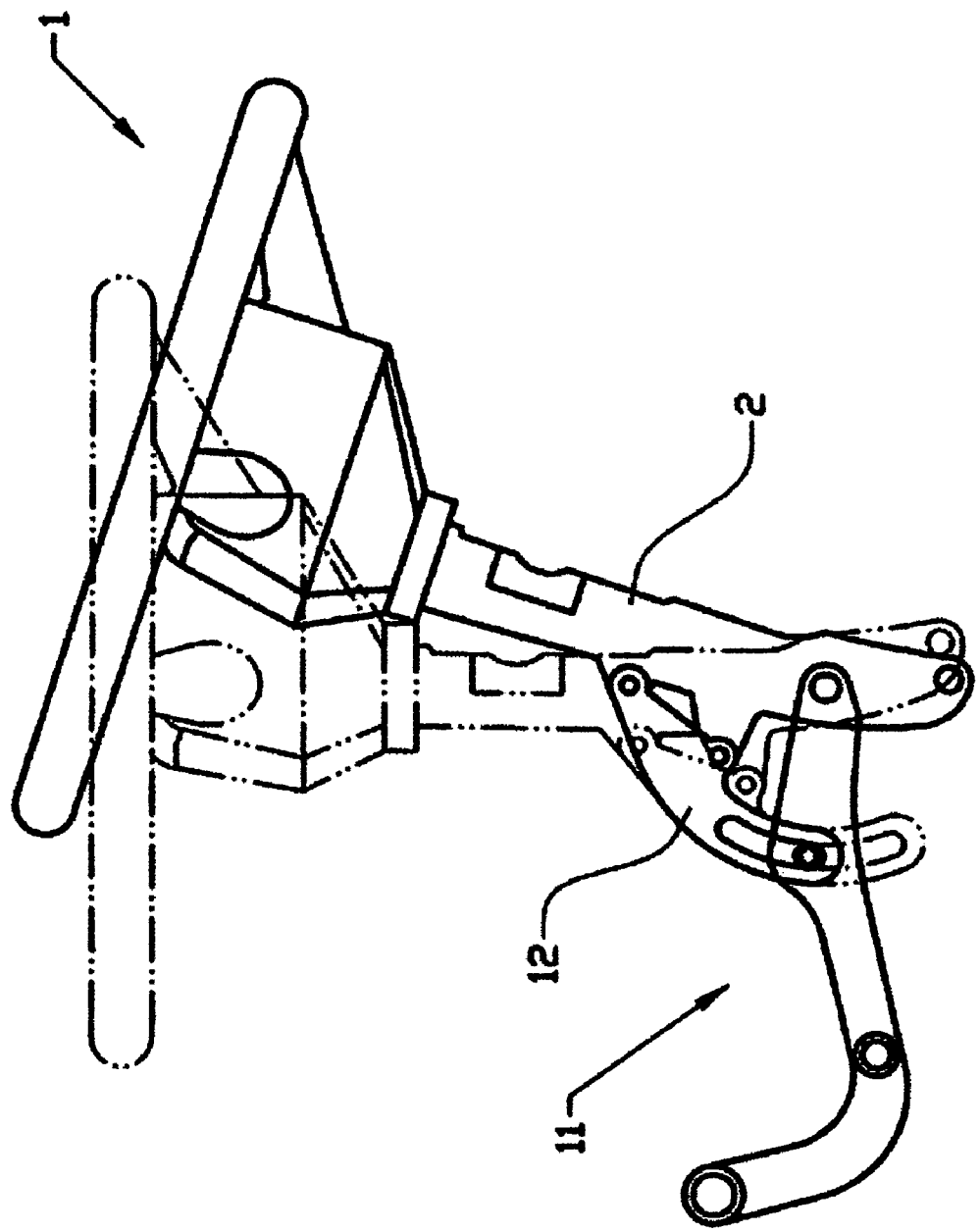
FIG. 4 is a diagrammatical, side elevational view demonstrating the first stage of a collision sequence where use is made of a vehicle steering wheel configured according to the invention and when mounted on a steering column.

FIG. 4 diagrammatically shows a side view of a first stage of a collision sequence where use is made of a vehicle steering wheel 1 configured according to the present invention and which is mounted on a steering column 10. The steering wheel 1 is, via the steering main shaft 2, arranged in an articulated manner on a steering column 11. The steering column 11, which is mounted firmly in the dashboard (not shown) of the vehicle, comprises a steering wheel adjustment device 12 by means of which the driver 13 can set the steering wheel 1 in the vertical direction and the longitudinal direction. The device is shown in a first and a second position.

The first position shown shows the steering wheel 1 before a vehicle collision has occurred, with the steering main shaft 2 angled slightly toward the driver 13. In the second position, a vehicle collision has occurred, and the driver 13 has been thrown toward the steering wheel 1 and the collision energy has initially been absorbed by the steering column 11 while the steering main shaft 2 has been pivoted up from its first position into a second, essentially vertical position.

As the collision sequence continues, energy absorption will take place by controlled deformation of the steering wheel, as the spokes of the steering wheel are adapted to be deformed while absorbing energy when given loading takes place in the radial direction of the steering wheel at the same time as the steering wheel ring is sufficiently rigid to remain essentially intact under said compressive load. This means that, during the collision sequence, displacement of the steering wheel ring relative to the steering wheel center will take place with simultaneous deformation of the spokes.

FIGS. 5-7 diagrammatically show, from the side, a preferred embodiment of the invention during a collision sequence. FIG. 5 shows the invention before the driver 13 has struck the steering wheel 1 with the steering main shaft 2 angled toward the driver 13.

FIG. 6 shows the invention in a first stage of a collision when the driver 13 has struck the steering wheel 1 and the collision energy is initially absorbed by the steering column 10 while the steering main shaft 2 is pivoted up from its first position into a second, essentially vertical position.

FIG. 7 shows the arrangement when the spokes 5 of the steering wheel have been deformed, while absorbing energy, while the steering wheel ring 3 has remained essentially intact.

The invention is not limited to the illustrative embodiments described above and shown in the drawings, but can be varied freely within the scope of the patent claims. For example, the invention can be used in different types of heavy-duty vehicles, for example trucks or buses, but also for other types of heavy-duty vehicles such as wheel loaders, dumpers and the like.

Furthermore, the steering wheel can be made from metal alloys other than aluminum such as steel or magnesium. Moreover, the steering wheel can be manufactured in ways other than by die-casting, for example in separate parts which are then joined together to form a unit by welding.

According to an alternative embodiment, the steering wheel spokes can be provided with weakenings which can be brought about by means of what are known as indications or by parts of a spoke consisting of thinner material in order to make possible controlled deformation. These weakenings can be combined with the spokes also being designed with one or more folds.

Furthermore, the steering wheel ring can be provided with a varying cross section in the portion 3a, where the cross section is greatest in the middle of the portion and smallest at the ends.

What is claimed is:

1. A vehicle steering wheel (1) comprising:
   a steering wheel ring (3) connected to a steering wheel center (4) via at least one steering wheel spoke (5);
   said at least one steering wheel spoke (5) developing a deformation while absorbing energy from external loading arising in connection with a vehicle collision, and wherein said external loading takes place in the radial direction of the steering wheel (1) causing a displacement of said steering wheel ring (3), relative to the steering wheel center (4); and
   said steering wheel ring (3) retains its shape when said deformation of the steering wheel spoke (5) takes place;
   wherein said steering wheel ring is designed with a first portion (3a) which has a wider cross section than a second portion (3b), which second portion is shorter than the first portion, for the purpose of essentially retaining the shape of the steering wheel ring when said deformation of the steering wheel spoke takes place.

2. The vehicle steering wheel (1) as recited in claim 1, wherein said at least one steering wheel spoke (5) has at least one deformation portion (8) that develops said deformation.

3. The vehicle steering wheel (1) as recited in claim 2, wherein said at least one deformation portion (8) has at least one fold (9) that facilitates said deformation of said at least one steering wheel spoke (5) when said external loading in the radial direction of the steering wheel (1) causes the displacement of the steering wheel ring (3) relative to the steering wheel center (4).

4. The vehicle steering wheel (1) as recited in claim 2, wherein said deformation portion (8) has a relatively abrupt change in the direction of extension of the spoke (5) in the form of an angle (10), which angle (10) has an extension which lies in a plane essentially parallel to the plane of extension of the steering wheel ring, in order to make possible control of the direction of the deformation.

5. The vehicle steering wheel (1) as recited in claim 2, wherein said deformation portion (8) has weakenings selected from indications and the use of thinner material in said deformation portion to allow displacement of the steering wheel ring (3) relative to the steering wheel center (4).

6. The vehicle steering wheel (1) as recited in claim 1, wherein said steering wheel spoke (5) withstands said deformation when external stresses are applied in a non-radial direction of the steering wheel.

7. The vehicle steering wheel (1) as recited in claim 1, wherein said vehicle steering wheel (1) comprises four steering wheel spokes (5).

8. The vehicle steering wheel (1) as recited in claim 1, wherein said vehicle steering wheel (1) is arranged essentially horizontally in a vehicle so that the steering wheel ring (3) has a plane of extension that coincides with a plane essentially parallel to the floor of the vehicle.

9. The vehicle steering wheel (1) as recited in claim 1, wherein said steering wheel (1) is at right angles to a steering main shaft (2).

10. The vehicle steering wheel (1) as recited in claim 1, wherein said vehicle steering wheel (1) is made of a die-cast material.

11. The vehicle steering wheel (1) as recited in claim 10, wherein said die-cast material consists of an aluminum alloy.

12. The vehicle steering wheel (1) as recited in claim 10, wherein said die-cast material consists of steel.

13. The vehicle steering wheel (1) as recited in claim 1, wherein said steering wheel ring is designed so that the first portion (3a) is in a normal driving position arranged at essentially a greater distance from the driver than the second portion (3b), the steering wheel, in the normal driving position, having essentially horizontal positioning and an unrotated condition whereby the vehicle wheels are not turned.

14. The vehicle steering wheel (1) as recited in claim 7, wherein said steering wheel ring has a first portion (3a) which has a wider cross section than a corresponding second portion (3b) for the purpose of essentially retaining the shape of the steering wheel ring when said deformation of at least one steering wheel spoke takes place, said first portion (3a) extending between two of the spokes and said second portion constituting the remaining part of the steering wheel ring.

15. A heavy-duty vehicle including a vehicle steering wheel (1), said vehicle steering wheel (1) comprising:
   a steering wheel ring (3) connected to a steering wheel center (4) via at least one steering wheel spoke (5);
   said at least one steering wheel spoke (5) developing a deformation while absorbing energy from external loading arising in connection with a vehicle collision, and wherein said external loading takes place in the radial direction of the steering wheel (1) causing a displacement of said steering wheel ring (3), relative to the steering wheel center (4); and
   said steering wheel ring (3) retains its shape when said deformation of the steering wheel spoke (5) takes place;
   wherein said steering wheel ring is designed with a first portion (3a) which has a wider cross section than a second portion (3b), which second portion is shorter than the first portion, for the purpose of essentially retaining the shape of the steering wheel ring when said deformation of the steering wheel spoke takes place.

* * * * *